US006546390B1

(12) United States Patent
Pollack et al.

(10) Patent No.: US 6,546,390 B1
(45) Date of Patent: Apr. 8, 2003

(54) METHOD AND APPARATUS FOR EVALUATING RELEVANCY OF MESSAGES TO USERS

(75) Inventors: Jordan Pollack, Sudbury, MA (US); Shaun Cutts, Somerville, MA (US); Andres Rodriguez, Newton, MA (US)

(73) Assignee: Abuzz Technologies, Inc., Cambridge, MA (US)

( * ) Notice: Subject to any disclaimer, the term of this patent is extended or adjusted under 35 U.S.C. 154(b) by 0 days.

(21) Appl. No.: 09/330,332

(22) Filed: Jun. 11, 1999

(51) Int. Cl.$^7$ ............................................. G06F 17/30
(52) U.S. Cl. ........................................................ 707/7
(58) Field of Search ........................... 707/1–100, 104; 709/219

(56) References Cited

U.S. PATENT DOCUMENTS

| | | |
|---|---|---|
| 5,283,856 A | 2/1994 | Gross et al. |
| 5,555,346 A | 9/1996 | Gross et al. |
| 5,590,269 A | 12/1996 | Kruse et al. ................. 395/209 |
| 5,619,648 A | 4/1997 | Canale et al. ........... 395/200.01 |
| 5,642,502 A | 6/1997 | Driscoll ....................... 395/605 |
| 5,649,186 A | 7/1997 | Ferguson .................... 395/610 |
| 5,706,497 A | 1/1998 | Takshashi et al. .......... 395/605 |

(List continued on next page.)

OTHER PUBLICATIONS

U.S. patent application Publication No. US 2002/0010804 A1, Publication Date: Jan. 24, 2002 (Sanghvi et al).
U.S. patent application Publication No. US 2002/0016735 A1, Publication Date: Feb. 7, 2002 (Runge et al).

Robert Kass, et al., "Intelligent Assistance for the Communication of Information in Large Organizations", pp. 171–178, EDS Center for Advanced Research.

Ernst Lutz, et al., "MAFIA—An Active Mail–Filter–Agent for an Intelligent Document Processing Support", pp. 235–251, Multi–User Interfaces and Applications. 1990.

Thomas W. Malone, et al., "The Information Lens: An Intelligent System for Information Sharing and Coordination", pp. 65–88, Lawrence Elbaum Associates, 1989.

Marx, et al., "CLUES: Dynamic Personalized Message Filtering", pp. 113–121, MIT Media Laboratory, Speech Research Group, 1996.

Irene Stadnyck, et al., "Modeling User's Interests in Information Filters", pp. 49–50, Communications of the ACM, vol. 35, No. 12, Dec. 1992.

http://www.echomail.com/main.html, 12 pages, Printed on Aug. 4, 1999 14:16:42.

Product Summary, Inference, Knowledge Creation.

*Primary Examiner*—Diane D. Mizrahi
*Assistant Examiner*—Apu Mofiz
(74) *Attorney, Agent, or Firm*—Wolf, Greenfield & Sacks, P.C.

(57) ABSTRACT

A method and system for evaluating the relevancy of an incoming message to a plurality of users are disclosed. Similarity scores indicating similarities of the incoming message to features of a plurality of messages are generated. Relevancy scores are generated for the plurality of users indicating relevancies of the incoming message to the plurality of users based on the similarity scores and a plurality of user profiles including information descriptive of the plurality of users' preferences for the features.

45 Claims, 2 Drawing Sheets

U.S. PATENT DOCUMENTS

| | | | |
|---|---|---|---|
| 5,717,913 A | | 2/1998 | Driscoll |
| 5,724,567 A | * | 3/1998 | Rose et al. .................. 395/602 |
| 5,737,728 A | | 4/1998 | Sisley et al. .................... 705/8 |
| 5,799,304 A | | 8/1998 | Miller |
| 5,819,267 A | | 10/1998 | Uyama ........................... 707/6 |
| 5,819,269 A | | 10/1998 | Uomini ........................... 707/7 |
| 5,822,527 A | | 10/1998 | Post ...................... 395/200.36 |
| 5,826,022 A | | 10/1998 | Nielsen |
| 5,867,799 A | * | 2/1999 | Lang et al. ..................... 707/1 |
| 5,870,744 A | | 2/1999 | Sprague ......................... 707/9 |
| 5,909,679 A | | 6/1999 | Hall ............................... 707/4 |
| 5,999,932 A | | 12/1999 | Paul |
| 6,029,195 A | * | 2/2000 | Herz .......................... 709/219 |
| 6,052,709 A | | 4/2000 | Paul |
| 6,072,942 A | | 6/2000 | Stockwell et al. |
| 6,119,114 A | | 9/2000 | Smadja |
| 6,189,002 B1 | | 2/2001 | Roitblat |
| 6,249,805 B1 | | 6/2001 | Fleming, III |
| 6,266,692 B1 | | 7/2001 | Greenstein |
| 6,393,423 B1 | | 5/2002 | Goedken |

* cited by examiner

| | $u_0$ | $u_1$ | $u_2$ | $u_3$ | $u_4$ | $u_5$ | $u_6$ | $u_7$ | $u_8$ | $u_9$ |
|---|---|---|---|---|---|---|---|---|---|---|
| $m_0$ | .21 | .25 | .81 | -.60 | -.04 | .59 | .76 | .08 | .41 | .46 |
| $m_1$ | .76 | .27 | .86 | .54 | .24 | -.74 | .71 | .56 | -.56 | .21 |
| $m_2$ | -.84 | -.38 | .76 | .92 | .19 | -.56 | .75 | -.04 | -.39 | .34 |
| $m_3$ | .45 | .21 | | -.85 | -.25 | -.68 | | .47 | .55 | .50 |
| $m_4$ | | .20 | .79 | -.52 | | .60 | .75 | -.67 | .62 | .60 |
| $m_5$ | .09 | -.31 | .78 | -.64 | .15 | -.51 | .80 | .93 | .61 | .61 |
| $m_6$ | -.24 | .22 | | .61 | .19 | .61 | .73 | -.96 | -.46 | .49 |
| $m_7$ | -.33 | .28 | .91 | .76 | -.13 | .48 | .72 | .91 | | .32 |

Users

*FIG. 2*

METHOD AND APPARATUS FOR EVALUATING RELEVANCY OF MESSAGES TO USERS

RELATED APPLICATIONS

This application is related to the following commonly owned applications, some of which disclose subject matter related to the disclosure of the present application, and which are hereby incorporated by reference in their entirety:

U.S. Utility Patent Application entitled "Method and Apparatus for Regulating Information Flow to Users," filed concurrently herewith under U.S. patent application Ser. No. 09/330,505; and U.S. Utility Patent Application entitled "Method and Apparatus for Distributing Information to Users," filed concurrently herewith under U.S. patent applecation Ser. No. 09/330,779.

BACKGROUND OF THE INVENTION

A variety of computer-based systems for facilitating communications among users have been developed. For example, electronic mail (email) systems allow users to send messages to one or more specified recipients. The specified recipients of a message may retrieve and read the message at any time, and may respond to the message or forward it to other users. Email systems typically provide the ability to create mailing lists to facilitate communication among groups of users having common roles or interests. News services (also referred to as "clipping services") deliver to users selected news articles covering topics of interest to the users. Such news services typically select which news articles to deliver to users by comparing words in the news articles to keywords provided by the users. Electronic bulletin board systems allow groups of users to create electronic bulletin boards, also referred to as "newsgroups," that typically correspond to a particular topic. Any user who subscribes to a newsgroup may post messages to the newsgroup and read messages posted to the newsgroup by other subscribed users. Electronic "chat rooms" enable users to communicate with each other in real-time by entering messages that are immediately communicated to and viewable by other users in the same chat room. The public Internet is increasingly being used as a medium for these and other forms of electronic communication.

One problem associated with such communication systems is that of "information overload." Users of such systems often find themselves presented with such a large volume of information (e.g., email messages or newsgroup postings) that they find it difficult or impossible to manually examine all of the information in order to identify the information that is relevant to them. As a result, users may fail to receive or read information that is relevant to them and to engage in potentially fruitful communications. Similarly, users who transmit information using such communications systems may fail to reach desirable recipients because such recipients are unable to separate relevant from irrelevant messages.

A variety of automated and semi-automated systems have been developed to help users organize and filter information received using electronic communications systems. For example, some systems attempt to deliver messages only to users to whom the messages are relevant. Such systems typically allow each user to define a set of preferences that indicate the user's interests. Such preferences may, for example, include keywords that describe the user's interests. Typically, such systems store incoming messages in a database as they are received by the system. When a certain number of messages have been received, the system performs a query on the database using each user's preferences. Each query typically produces scores for the messages in the database indicating the relative relevancies of the messages. The system uses these scores to determine which messages stored in the database are sufficiently relevant to forward to the corresponding user.

One problem with such conventional systems is that they require that multiple messages be received by the system before the relevancies of the messages can be determined. This requirement delays the delivery of incoming messages to users of the system. Such systems may therefore not be appropriate for environments in which communications need to be delivered quickly, such as enterprise email systems.

Another problem with such conventional systems is that their performance degrades as the number of system users increases. As described above, such systems perform a database query for each user of the system. The number of queries that must be performed therefore increases in proportion to the number of system users. Performance of such queries on large databases of messages can impose a significant load on the system and further delay the transmission of communications to appropriate recipients.

A further problem with such conventional systems is that users of such systems have limited control over the number and frequency of messages they receive from the system. Defining user preferences using keywords primarily serves to define the subject matter in which the user is interested, but does not place any bounds on the number or frequency of messages that the system will deliver to the user. As a result, users of such systems may experience "down" times during which they are ready and willing to receive, read, and respond to messages but during which they receive few messages or none at all. Similarly, users of such systems may be overloaded by a flood of messages that match the users' preferences. Such systems, therefore, fail to address a primary aspect of the problem of information overload.

SUMMARY OF THE INVENTION

In one aspect, a system is provided for evaluating the relevancy of an incoming message to a plurality of users. The system includes a message feature database including records descriptive of features of a plurality of messages, a similarity engine having an input to receive the incoming message and an output to deliver similarity scores indicating similarities of the incoming message to the features, a user profiles database including profiles of the plurality of users, the profiles including information descriptive of the plurality of users' preferences for the features, and a relevancy engine having a first input to receive the similarity scores, a second input to receive the profiles in the user profiles database, and an output to deliver relevancy scores indicating relevancies of the incoming message to the plurality of users. The user profiles database may include a preference matrix indicating preferences of the plurality of users for the features, and wherein the relevancy engine is adapted to generate the relevancy scores by performing vector multiplication of a vector representing the similarity scores by vectors in the preference matrix.

The system may include a delivery mechanism having a first input to receive the incoming message, a second input to receive the relevancy scores, a third input to receive the profiles of the plurality of users, and an output to deliver to the user message information based on the incoming message, the relevancy scores, and the profiles of the plurality of users. The user profiles may include relevancy thresholds for the plurality of users, and the delivery mechanism may include a relevancy thresholder to compare to the relevancy scores to the relevancy thresholds to generate relevancy determinations indicating whether the incoming message is sufficiently relevant to the plurality of users. The user profiles database may include a maximum number of users to whom the message information is to be delivered, and wherein the delivery mechanism is configured to deliver the message information to no greater than the maximum number of users. The user profiles database may include relevancy thresholds for a plurality of users, and the delivery mechanism may be configured to compare the relevancy scores to the relevancy thresholds and to deliver the message information only to those users whose relevancy scores satisfy the corresponding relevancy thresholds. The delivery mechanism may be configured to deliver the message information to at least some of the plurality of users as an electronic mail message. The delivery mechanism may be configured to update a message display using the message information. The system may further include means for modifying the user profiles database based on user feedback received from a user.

In another aspect, a method is provided for evaluating the relevancy of an incoming message to a plurality of users. The method includes steps of generating similarity scores indicating similarities of the incoming message to features of a plurality of messages; and generating relevancy scores for the plurality of users indicating relevancies of the incoming message to the plurality of users based on the similarity scores and a plurality of user profiles including information descriptive of the plurality of users' preferences for the features. The step of generating the relevancy scores may include steps of querying a message feature database using the incoming message to develop search results, the message feature database including records descriptive of features of a plurality of messages; and generating the relevancy scores based on the search results. The user profiles may include a preference matrix indicating preferences of the plurality of users for the features, and the step of generating the relevancy scores may, for example, include a step of generating the relevancy scores by performing vector multiplication of a vector representing the similarity scores by vectors in the preference matrix. The relevancy scores may, however, be generated in any manner. The method may further include a step of providing the relevancy scores to a delivery mechanism to deliver message information derived from the incoming message, the relevancy scores, and the profiles of the plurality of users to at least some of the plurality of users.

The method may further include steps of receiving user feedback from one of the plurality of users; and modifying the user's profile in the user profiles database based on the user feedback. The step of receiving user feedback may include a step of receiving an indication from the user that the user has expressed a positive preference for the message information. The step of receiving user feedback may include a step of receiving an indication from the user that the user has expressed a negative preference for the message information.

The method may further include steps of developing message information based on the incoming message, the relevancy scores, and the profiles of the plurality of users to the plurality of users, and delivering the message information to at least some of the plurality of users. The user profiles database may include relevancy thresholds for the plurality of users, the step of developing the message information may include a step of comparing the relevancy scores to the relevancy thresholds; and the step of delivering the message information may include a step of delivering the message information only to those users whose relevancy scores satisfy the corresponding relevancy thresholds. The user profiles database may include a maximum number of users to whom the message information is to be delivered, and the step of delivering the message information may include a step of delivering the message information to no greater than the maximum number of users. The step of delivering the message information may include a step of sending the message information to the at least some of the plurality of users as an electronic mail message, or a step of updating a message display using the message information.

In other aspects, a system and a computer-readable medium are provided for evaluating the relevancy of an incoming message to a plurality of users.

Other aspects of the invention include the various combinations of one or more of the foregoing aspects of the invention, as well as the combinations of one or more of the various embodiments thereof as found in the following detailed description or as may be derived therefrom. The foregoing aspects of the invention also have corresponding computer-implemented processes which are also aspects of the present invention. Other embodiments of the present invention may be derived by those of ordinary skill in the art both from the following detailed description of a particular embodiment of the invention and from the description and particular embodiment of a system in accordance with the invention.

BRIEF DESCRIPTION OF THE DRAWINGS

FIG. 2 is a diagram of an example of a preference matrix for storing preferences of users in a system for evaluating relevancy of messages to the users.

DETAILED DESCRIPTION

Figure 1:
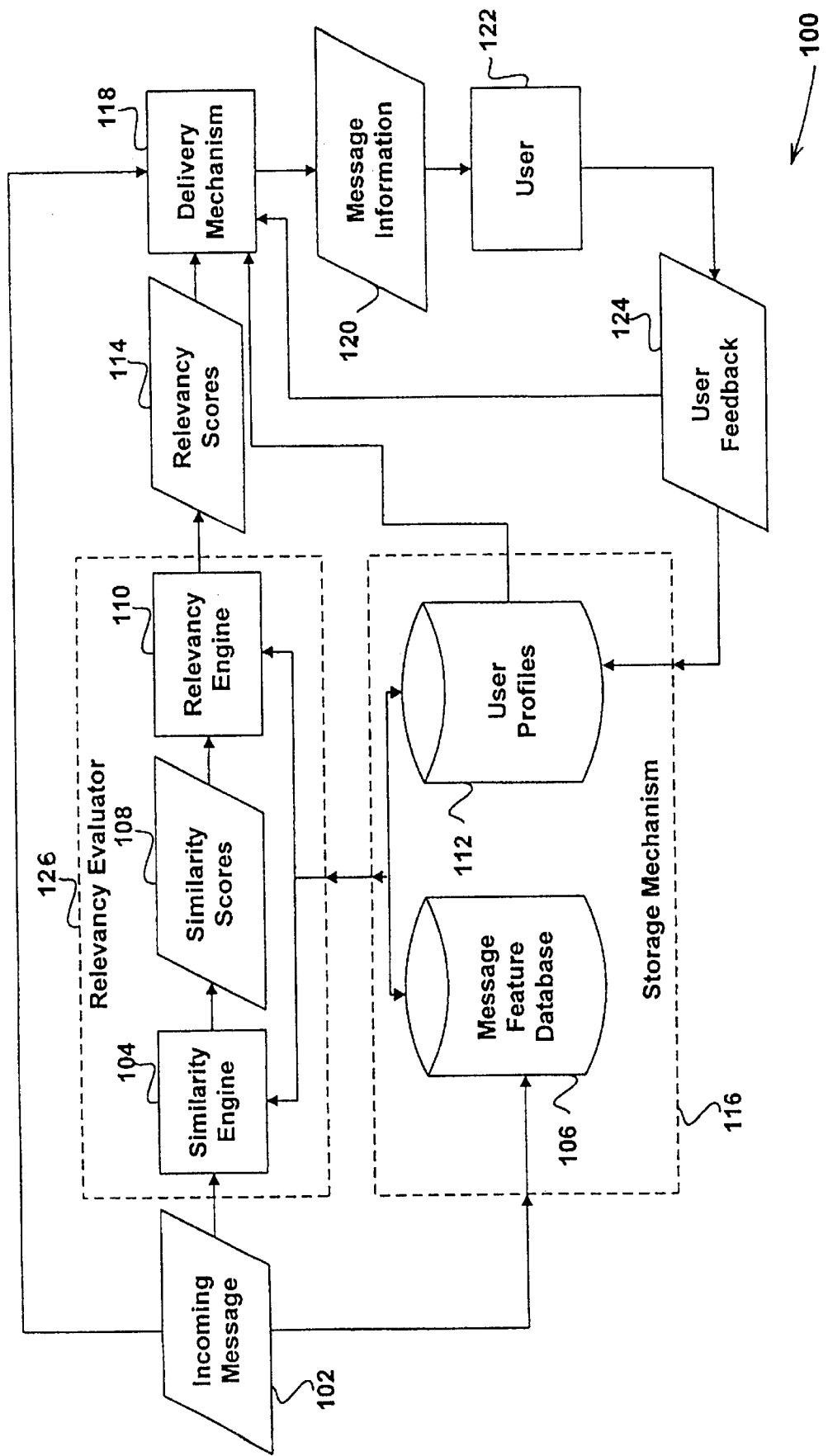
FIG. 1 is a dataflow diagram of a system for evaluating relevancy of messages to users.

A relevancy evaluation system is provided that evaluates the relevancy of incoming messages to each of one or more users. The relevancy of each incoming message to each of the users may be evaluated without waiting for the receipt of subsequent messages. The system may include a delivery mechanism to deliver incoming messages to users. The delivery mechanism may, for example, be used to filter out messages based on their relevancy to each user and to deliver to each user only those messages that are particularly relevant to that user. Users may interactively modify the relevancy criteria used by the system and the manner in which the delivery mechanism determines whether to deliver messages to users.

For example, referring to FIG. 1, an example of a relevancy evaluation system 100 used by one or more users is shown. An incoming message 102 is received by the system 100. The incoming message 102 may, for example, be an electronic mail (email) message directed to one of the system's users. The incoming message is delivered as an input to a relevancy evaluator 122. The relevancy evaluator 114 generates relevancy scores 114 representing relevancies of the incoming message 102 to the users of the system 100. Each of the relevancy scores 114 indicates a relevancy of the incoming message 102 to a particular user of the system 100.

The relevancy evaluator 122 may, for example, include a similarity engine 104, similarity scores 108, and a relevancy engine 110. The similarity engine 104 may, for example, be a standard text-based search engine such as Alta Vista, Verity, or a Wide Area Information Server (WAIS), which compare words in a search query with words in an index of documents maintained by the search engine. The similarity engine 104 may, for example, be an engine based on Latent Semantic Analysis, or use any other natural language analysis techniques such as word stemming or part-of-speech tagging. A storage mechanism 116 stores information related to user preferences and previous incoming messages received by the system 100. The storage mechanism 116 may, for example, include a message feature database 106 and user profiles 112. The message feature database 106 may, for example, contain records for a plurality of messages, such as previous incoming messages received by the system 100. When the similarity engine 104 is a standard search engine, the message feature database 106 may, for example, be a standard search engine index indexing a plurality of messages. The similarity engine 104 queries the message feature database 106 with the incoming message 102 to produce similarity scores 108. For example, a similarity score produced based on a comparison between the incoming message 102 and one of the previously-received messages in the message feature database 106 may be a floating point value between $S_{Min}$ and $S_{Max}$ indicating a degree of similarity between the incoming message 102 and the previously-received message. $S_{Min}$ and $S_{Max}$ may be any appropriate values, such as 0 and 1 or −1 and +1.

The similarity scores 108 and the user profiles 112 are delivered as an input to the relevancy engine 110. The relevancy engine 110 generates the relevancy scores 114 using the similarity scores 108 and the user profiles 112. The user profiles 112 include profiles of the users of the system 100. The user profiles 112 may include, for example, information descriptive of the users' preferences for at least some of the plurality of messages represented in the message feature database 106. The relevancy scores 114 may, for example, be floating point values ranging between $R_{Min}$ and $R_{Max}$ indicating the relevance of the incoming message 102 to the users of the system 100. $R_{Min}$ and $R_{Max}$ may be any appropriate values, such as 0 and 1 or −1 and +1.

The incoming message 102 and the relevancy scores 114 are provided to a delivery mechanism 118. The delivery mechanism 120 generates message information 120 from the relevancy scores 114 and the incoming message 102 and delivers the message information 120 to users of the system 100, such as a user 122. As described in more detail below, the message information 120 may include information derived from the incoming message 102 and/or information about the relevancy score of the incoming message 102 for the user 122. The incoming message 102 is also provided to the storage mechanism 116, which stores the incoming message 102 or information derived therefrom in the message feature database 106.

The user provides user feedback 124 to the storage mechanism 116 and/or the delivery mechanism 118. As described in more detail below, the user feedback 124 may, for example, be used to modify the profile of the user 122 in the user profiles 112. The user feedback 124 may also be used to modify the operation of the delivery mechanism 118.

To generate the relevancy scores 114, the relevancy evaluator 122 queries the storage mechanism 116 using the incoming message 102 as the query to generate the relevancy scores 114 as an output. This differs from conventional systems, which typically accumulate incoming messages over time into a message database, and then periodically use a search engine to query the message database once for each of a plurality of user profiles corresponding to users of the system. One advantage of the relevancy evaluator 122 shown in FIG. 1 is that it may evaluate the relevancy of the single incoming message 102, without waiting to receive additional incoming messages. A further advantage of the relevancy evaluator 122 of FIG. 1 is that it queries the storage mechanism 116 only once using the incoming message 102, rather than querying a message database multiple times using a plurality of user profiles. The relevancy of the incoming message 102 may, therefore, be performed more efficiently with the relevancy evaluator 122 than with conventional systems.

The message information 120 may be any information derived from or related to the incoming message 102. For example, the message information 120 may include a summary of the incoming message 102, a relevancy score of the incoming message 102, keywords extracted from the incoming message, a subject line of the incoming message, or the entire contents of the incoming message 102. The message information 120 may include information related to the incoming message 102, such as the time of receipt of the incoming message 102, the author of the incoming message 102, or the size of the incoming message 102.

The delivery mechanism 118 may deliver the message information 120 to the user 122 in any manner. For example, the message information 120 may be an email message including the contents of the incoming message 102, in which case the delivery mechanism 118 may be a combined filter and email server that sends the message information 120 to the user 122 using standard techniques for delivering email. Alternatively, the delivery mechanism 118 may post the message information 120 to a web page accessible to the user 122. The delivery mechanism may also update a message display using the message information 120. For example, the delivery mechanism 118 may maintain a message display that displays a predetermined number (e.g., 10) of messages received by the system 100 that are most relevant to the user 122. The display mechanism 118 may maintain such a message display for each user of the system 100. As new incoming messages are received by the system 100, the delivery mechanism 118 may update the users' message displays to display the most relevant messages to the users, ranked in order of relevance. When a user reads or selects a message, the delivery mechanism 118 may remove the message from the user's message display.

The delivery mechanism 118 may, for example, determine whether to deliver the message information 120 to the user using information contained in the incoming message 102, the relevancy scores 114, and the user profiles 112. For example, the user profiles 112 may include relevancy thresholds associated with users of the system 100. The delivery mechanism 118 may include a relevancy thresholder to compare the relevancy scores 114 to the relevancy thresholds to determine which of the relevancy scores 114 satisfy the corresponding relevancy thresholds. The delivery mechanism 118 may then only deliver the message information 120 to users whose relevancy scores satisfy their relevancy thresholds. Alternatively, the relevancy thresholder may, for example, take into account previous messages that have been delivered to a user when determining whether the incoming message 102 is relevant to the user. For example, the relevancy thresholder may take into account the amount of time that has passed since an incoming message has been delivered to the user when determining whether the current incoming message 102 is relevant to the user. An example of the delivery mechanism 118 is described in more detail in U.S. Utility Patent Application entitled "Method and Apparatus for Regulating Information Flow to Users," filed concurrently herewith under U.S. patent application Ser. No. 09/330,505.

The system 100 shown in FIG. 1 has a number of benefits and advantages. For example, by thresholding the relevancy score of the incoming message for each user, the users of the system are presented only with those incoming messages that are sufficiently relevant to them. If users of the system 100 typically receive a large number of messages, including a large number of messages that are not sufficiently relevant to them to warrant attention, filtering of insufficiently relevant messages may allow such users to avoid spending a significant amount of time evaluating and/or reading insufficiently relevant messages.

Generating a separate relevancy score for the incoming message 102 for each user of the system 100 and maintaining separate user profiles 112 for each user of the system allows the system to behave according to the needs and preferences of individual users. For example, one user might adjust the relevancy threshold in his user profile to filter out all but the messages that are most relevant to him, while another user might adjust her relevancy threshold to filter out only the messages that are least relevant to her. Generation of separate relevancy scores 114 and maintenance of separate user profiles 112 for each user of the system 100 makes such customization possible.

A further advantage of the system 100 is that it may generate relevancy scores 114 for the incoming message 102 without waiting to receive subsequent incoming messages. Conventional systems typically queue a number of incoming messages and then generate relevancies of the incoming messages relative to each other. Such queuing increases the delay between the time that an incoming message is received and the time that the incoming message can be filtered and otherwise processed by the system. The system 100, in contrast, may evaluate the relevancy of a single incoming message (such as the incoming message 102) and filter or otherwise process the incoming message by itself, before receiving or processing any other incoming messages. As a result, results of evaluating the relevancy of the incoming message 102 may be communicated immediately to users of the system 100, such as by displaying the incoming message 102 to those users for whom the incoming message 102 is sufficiently relevant. Results of evaluating the relevancy of the incoming message 102 may also be communicated to users of the system 100 in other ways, such as by notifying the users of the results by email, facsimile, or telephone.

An additional advantage of the system 100 is that the user profiles 112 may be dynamically and interactively modified to influence the operation of the system 100. For example, as described in more detail below, the user 122 may interactively provide user feedback 124 to modify the user's profile in the user profiles 112 to reflect changes in his or her preferences. Such changes may be performed relatively quickly and may influence the relevancy evaluations performed by the system 100 immediately. In contrast, changes made to profiles of users in conventional systems typically are not made noticeable to the user until the next time the system processes a batch of incoming messages. As described above, such processing may only occur infrequently. As a result, users of such systems have limited control over the quality and quantity of messages that are delivered to them.

The elements of FIG. 1 will now be described in more detail. The incoming message 102 may be any kind of message, document, or data that may be broadcast or directed to one or more users. The incoming message 102 may, for example, be an electronic mail (email) message directed to one or more specified users. The incoming message 102 may also, for example, be a newsgroup posting, a message posted to a chat room, information derived from a web page, or information extracted from a database or other data store. The incoming message 102 may include any kind of data, such as text, graphics, images, sounds, or any combination thereof.

The similarity engine 104 may, for example, be a standard search engine that compares query text (e.g., the incoming message 102) to a database (e.g., the message feature database 106). Such a search engine compares the query text to records in the database and produces a score for each record in the database indicating whether and/or how closely the query text matches the record. The similarity engine 104 may use any of a variety of well-known methods for comparing the incoming message 102 to the message feature database 106 to produce the similarity scores 108. The similarity scores 108 may include scores for fewer than all of the records in the similarity engine database 100. For example, the similarity scores 108 may include scores only for those records in the message feature database 106 that match the incoming message 102 particularly well or particularly poorly.

Although, as described above, the message feature database 106 may contain records for previous incoming messages received by the system 100, the message feature database 106 is not limited to storing previous incoming messages. Rather, the message feature database 106 may include, for example, records corresponding to any feature of one or more messages. For example, the message feature database 106 may include abstracts or summaries of messages, combinations of messages that are similar to each other, or keywords derived from messages. The similarity scores 108 indicate the similarity of the incoming message 102 to the features represented in the message feature database 106. The messages represented in the message feature database 106 need not be messages previously transmitted using the system 100. Furthermore, the messages represented in the message feature database 106 may be any kind of documents or data. For example, the messages may be compressed messages, documents including keywords describing skills of employees, or employee resumes.

Although, as described above, the similarity scores 108 may be floating point values ranging between $S_{Min}$ and $S_{Max}$, indicating how well the records in the message feature database 106 match the incoming message 102, any of a variety of other scoring scales may be used. For example, the similarity scores 108 may be boolean values of either True or False, indicating whether particular records in the message feature database 106 match the incoming message 102.

Although, as described above, higher similarity scores are more optimal scores than lower similarity scores, the similarity scores 108 may be arranged in any order.

The user profiles 112 may indicate preferences of the users of the system in any manner. For example, the user profiles 112 may include, for one or more users of the system 100, a preference value indicating a preference of the user for a particular one of the questions represented in the message feature database 106. Such preference values may, for example, be represented as a preference matrix in which columns correspond to users of the system and rows correspond to questions represented in the message feature database 106. Referring to FIG. 2, an example of a preference matrix 200 is shown, in which preference values range from $P_{Min}=-1$ to $P_{Max}=1$. The preference matrix 200 includes columns $u_0-u_9$ corresponding to users of the system 100 and rows $m_0-m_7$ corresponding to previous incoming messages received by the system 100. The preference value $P_{c,r}$ stored in the preference matrix 200 at column c and row r corresponds to the preference of user $u_c$ to message $m_r$. For example, the preference matrix 200 indicates that the preference value corresponding to user $U_4$ and message $m_5$ is 0.15.

The preference value of a user with respect to a particular question may correspond to any of a number of characteristics of the user with respect to that question. For example, the messages represented in the message feature database 106 may be questions that have been asked of users of the system 100. In such a case, the preference value of a user for a question may indicate whether the user has previously responded to the question. For example, the preference value of a user for a question may be $P_{Max}$ if the user has responded to the question and $P_{Min}$ if the user has not responded to the question. Similarly, preference values may indicate degrees to which users have correctly answered questions represented in the message feature database 106. For example, preference values may be floating point values ranging from $P_{Min}$ to $P_{Max}$, where a preference value of $P_{Max}$ indicates that a user has answered a question entirely correctly and a preference value of $P_{Min}$ indicates that the user has answered the question entirely incorrectly. $P_{Min}$ and $P_{Max}$ may be any appropriate values, such as 0 and 1 or −1 and +1. Alternatively, preference values may indicate whether users have accepted or rejected questions, such as by using a value of one to indicate acceptance of a question and a value of zero to indicate rejection of a question.

The preference matrix 200 may be stored in a computer-readable medium in any manner. For example, the preference matrix 200 may be represented as a table in a database, as a multidimensional array, as an object according to an object-oriented programming language, a (singly- or doubly-) linked list, a two-dimensional hashing function, a sparse set of lists organized by row, a sparse set of lists organized by column, or as a sparse matrix. The preference matrix 200 may be distributed among a plurality of data structures or computer-readable media. For example, the portion of the preference matrix 200 corresponding to a particular user may be stored on the user's client computer to enable the client computer to generate relevancy scores for the user. Distributing the preference matrix 200 in this way enables multiprocessing of incoming messages and thereby increases the speed with which such messages may be processed.

Individual users may have multiple profiles in the user profiles 112. For example, a user may choose to create multiple profiles corresponding to multiple topics and to store messages that are particularly relevant to the user based on a particular profile in a bind corresponding to that profile. Each profile for a user may be assigned a distinct column in the preference matrix 200 so that columns in the preference matrix 200 correspond to user profiles rather than to users.

The user feedback 124 may take any of a variety of forms. For example, the user 122 may indicate in the user feedback 124 that the incoming message 102 is not of interest to the user 122. In response, the system 100 may update the user profiles 112 to indicate that the incoming message 102 is not of interest to the user 122. For example, the system 100 may modify the cell in the preference matrix 200 (FIG. 2) corresponding to the user 122 and the incoming message 102 to indicate that the user 122 is not interested in the incoming message (such as by changing the preference value in the cell to $P_{Min}$) The user feedback 124 may indicate an ordering of messages represented in the message feature database 106. For example, the user feedback 124 may indicate that the user 122 prefers a first message over a second message. In response to this feedback, the system 100 may then assign a more optimal (e.g., higher) preference value to the first message than to the second message for that user 122 in the user profiles 112. The system 100 may present a graphical display of the preference matrix 200 that is directly editable by the user 122, in which case the user feedback 124 represents changes made by the user 122 to the preference matrix 200. The techniques described above for updating the user profiles 112 in response to receipt of the user feedback 124 are provided merely for purposes of example and are not limiting; rather, the system 100 may update the user profiles 112 in response to receipt of the user feedback 124 in any of a variety of ways.

Modifications made to the user profiles 112 as a result of user input are immediately available for use in calculating relevancy scores 114 for subsequently-received incoming messages. The separation of the user profiles 112 from the message feature database 106 allows modifications to be made to the user profiles 112 particularly quickly and without causing noticeable delays to the users of the system 100. Such dynamic and adaptive modification of the user profiles 112 enables the system 100 to be responsive to changing needs and preferences of the system's users. For example, interactive modification of the user profiles 112 enables users to control the rate at which incoming messages are delivered to them, the degree to which incoming messages are filtered, and the number of messages displayed to them at any particular time.

The relevancy engine 110 may generate the relevancy scores 114 in any of a variety of ways. For example, if the user profiles 112 include a preference matrix, such as the preference matrix 200 shown in FIG. 2, the relevancy engine 110 may calculate the relevancy score of the incoming message 102 for a particular user by performing a vector multiplication of the incoming message 102 by the column in the preference matrix 200 corresponding to the user. For example, assume that the incoming message 102 produces the following vector S of similarity scores 108 (on a scale of $S_{Min}=0$ to $S_{Max}=1$): [.02 .98 .44 .52 .37 .99 .31 .89]. Each element $S_i$ in the vector S corresponds to the similarity score of the incoming message 102 with respect to message $m_i$. The relevancy engine 110 may generate a relevancy score of the incoming message 102 for a particular user, such as the user $U_4$, by multiplying the vector S by column $U_4$ in the preference matrix 200. The result is: $(.02*-.04)+(.98*.24)+(.44*.19)+(.52*-.25)+(.37*.06)+(.99*.15)+(.31*.19)+(.89*-.13)=.3019$. The relevancy engine 110 may, however, generate a relevancy score for the incoming message 102 in any manner.

The relevancy engine 110 may normalize the relevancy scores 114 before providing them to the delivery mechanism 118. The relevancy engine 110 may, for example, apply a sigmoid function to each relevancy score R, such as tanh R or $1/(1+e^{-R})$, to normalize the relevancy scores 114.

The system 100 may add a record corresponding to the incoming message 102 to the message feature database 106. Because modification of the message feature database 106 may be a time-consuming process, the system 100 may accumulate incoming messages and periodically (e.g., nightly) add records corresponding to the accumulated incoming messages in a batch.

The storage mechanism 116 may be any kind of mechanism for storing computer-readable data. For example, the storage mechanism 116 may be implemented as a relational database that associates users, messages, and relevancies of the messages to the users. As shown in FIG. 1, the storage mechanism 116 includes the message feature database 106 and the user profiles 112. Either or both of the message feature database 106 and the user profiles 112 may, however, be separate components of the system 100. For example, the message feature database 106 may be a separate component of the system 100 that the similarity engine 104 may directly query using the incoming message 102. Similarly, the user profiles 112 may be a separate component of the system 100 that the relevancy engine 110 may use, in combination with the similarity scores 108, to generate the relevancy scores 114.

A computer system for implementing the system 100 of FIG. 1 typically includes at least one main unit connected to both an output device which displays information to a user and an input device which receives input from a user. The main unit may include a processor connected to a memory system via an interconnection mechanism. The input device and output device also are connected to the processor and memory system via the interconnection mechanism.

It should be understood that one or more output devices may be connected to the computer system. Example output devices include cathode ray tubes (CRT) display, liquid crystal displays (LCD) and other video output devices, printers, communication devices such as a modem, storage devices such as a disk or tape, and audio output. It should also be understood that one or more input devices may be connected to the computer system. Example input devices include a keyboard, keypad, track ball, mouse, pen and tablet, communication device, and data input devices such as audio and video capture devices. It should be understood that the invention is not limited to the particular input or output devices used in combination with the computer system or to those described herein.

The computer system may be a general purpose computer system which is programmable using a computer programming language, such as C, C++, Java, or other language, such as a scripting language or even assembly language. The computer system may also be specially programmed, special purpose hardware, or an application specific integrated circuit (ASIC). In a general purpose computer system, the processor is typically a commercially available processor, of which the series x86 and Pentium series processors, available from Intel, and similar devices from AMD and Cyrix, the 680X0 series microprocessors available from Motorola, the PowerPC microprocessor from IBM and the Alpha-series processors from Digital Equipment Corporation, and the MIPS microprocessor from MIPS Technologies are examples. Many other processors are available. Such a microprocessor executes a program called an operating system, of which WindowsNT, Windows 95 or 98, IRIX, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system defines computer platform for which application programs in high-level programming languages are written.

A memory system typically includes a computer readable and writeable nonvolatile recording medium, of which a magnetic disk, a flash memory, and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or any combination thereof. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that invention is not limited to a particular computer platform, particular processor, or particular high-level programming language. Additionally, the computer system may be a multiprocessor computer system or may include multiple computers connected over a computer network. It should be understood that each module or step shown in the accompanying figures may correspond to separate modules of a computer program, or may be separate computer programs. Such modules may be operable on separate computers.

The foregoing description of a few embodiments is merely illustrative and not limiting, having been presented by way of example only. Numerous modifications and other embodiments are within the scope of one of ordinary skill in the art and are contemplated as falling within the scope of the invention.

What is claimed is:

1. A system for evaluating the relevancy of an incoming message to a user, the system comprising:

a message feature database including a plurality of records, each record descriptive of features of a message;

a similarity engine having an input to receive the incoming message, an input to receive the features of each message described by one of the records and an output to deliver a plurality of similarity scores, each similarity score indicating a similarity of the incoming message to the features of a respective one of the messages, wherein the similarity engine is operable to compare the incoming message to the features of each message to generate each respective similarity score;

a user profiles database including a profile of the user, including information descriptive of the user's preferences for the features of the messages; and a relevancy engine having a first input to receive the plurality of the similarity scores, a second input to receive the profile from the user profiles database, and an output to deliver a relevancy score indicating a relevancy of the incoming message to the user, wherein the relevancy engine is operable to compare the user profile to the plurality of similarity scores to generate the relevancy score.

2. The system of claim 1, wherein the user profiles database includes a preference matrix indicating preferences of a plurality of users, including the user, for the features, and wherein the relevancy engine is adapted to generate the relevancy score by performing vector multiplication of a vector representing the similarity scores by a vector in the preference matrix corresponding to the user.

3. The system of claim 1, further comprising:

a delivery mechanism having a first input to receive the incoming message, a second input to receive the relevancy score, a third input to receive the profile of the user, and an output to deliver to the user message information based on the incoming message, the relevancy score, and the profile of the user.

4. The system of claim 3, wherein the user profile includes a relevancy threshold for the user, and wherein the delivery mechanism includes a relevancy thresholder to compare to the relevancy score to the relevancy threshold to generate a relevancy determination indicating whether the incoming message is sufficiently relevant to the user.

5. The system of claim 3, wherein the user profiles database includes a maximum number of users to whom the message information is to be delivered, and wherein the delivery mechanism is configured to deliver the message information to no greater than the maximum number of users.

6. The system of claim 3, wherein the user profiles database includes a relevancy threshold for the user, and wherein the delivery mechanism is configured to compare the relevancy score to the relevancy threshold and to deliver the message information to the user only if the relevancy score satisfies the relevancy threshold.

7. The system of claim 3, wherein the delivery mechanism is configured to deliver the message information to the user as an electronic mail message.

8. The system of claim 3, wherein the delivery mechanism is configured to update a message display using the message information.

9. The system of claim 1, further comprising means for modifying the user profiles database based on user feedback received from a user.

10. A method of evaluating the relevancy of an incoming message to a user of a system having a message feature database including a plurality of records, each record descriptive of the features of a message and having a user profiles database including a profile of the user, including information descriptive of the user's preferences for the features of the messages, the method comprising steps of:

(A) generating a plurality of similarity scores, each similarity score indicating the similarity of the incoming message to the features of a respective one of the messages, including generating each similarity score by comparing the incoming message to the features of the respective one of the messages; and (B) generating a relevancy score for the user indicating a relevancy of the incoming message to the user based on the plurality of the similarity scores and the profile of the user, including comparing the user profile to the plurality of similarity scores to generate the relevancy score.

11. The method of claim 10, wherein the step (B) comprises steps of:

querying the message feature database using the incoming message to develop search results; and generating the relevancy score based on the search results.

12. The method of claim 10, wherein the user profiles includes a preference matrix indicating preferences of a plurality of users, including the user, for the features, and wherein the step (B) comprises steps of:

generating the relevancy score by performing vector multiplication of a vector representing the similarity scores by a vector in the preference matrix corresponding to the user.

13. The method of claim 10, further comprising a step of:

(C) providing the relevancy score to a delivery mechanism to deliver message information derived from the incoming message, the relevancy score, and the profile of the user to the user.

14. The method of claim 10, further comprising steps of:

(C) receiving user feedback from the user; and (D) modifying the user's profile in the user profiles database based on the user feedback.

15. The method of claim 14, wherein the step (C) comprises a step of receiving an indication from the user that the user has expressed a positive preference for the message information.

16. The method of claim 14, wherein the step (C) comprises a step of receiving an indication from the user that the user has expressed a negative preference for the message information.

17. The method of claim 10, further comprising steps of:

(C) developing message information based on the incoming message, the relevancy score, and the profile of the user; and (D) delivering the message information to the user.

18. The method of claim 17, wherein the user profiles database includes a relevancy threshold for the user, and wherein the step (C) comprises a step of:

(C)(1) comparing the relevancy score to the relevancy threshold; and wherein the step (D) comprises a step of:

(D)(1) delivering the message information to the user only if the relevancy score satisfies the relevancy threshold.

19. The method of claim 17, wherein the user profiles database includes a maximum number of users to whom the message information is to be delivered, and wherein the step (D) comprises a step of:

(D)(1) delivering the message information to no greater than the maximum number of users.

20. The method of claim 17, wherein the step (D) comprises a step of sending the message information to the user as an electronic mail message.

21. The method of claim 17, wherein the step (D) comprises a step of updating a message display using the message information.

22. A system for evaluating the relevancy of an incoming message to a user, the system comprising:

a message feature database including a plurality of records, each record descriptive of the features of a message;

a user profiles database including a profile of the user, including information descriptive of the user's preferences for the features of the messages;

means for generating a plurality of similarity scores, each similarity score indicating the similarity of the incoming message to the features of a respective one of the messages, including generating each similarity score by comparing the incoming message to the features of the respective one of the messages; and means for generating a relevancy score for the user indicating a relevancy of the incoming message to the user based on the plurality of the similarity scores and the profile of the user, including means for comparing the user profile to the plurality of similarity scores to generate the relevancy score.

23. The system of claim 22, wherein the means for generating the relevancy score comprises:

means for querying the message feature database using the incoming message to develop search results; and means for generating the relevancy score based on the search results.

24. The system of claim 22, wherein the user profiles includes a preference matrix indicating preferences of a plurality of users, including the user, for the features, and wherein the means for generating the relevancy scores comprises:

means for generating the relevancy score by performing vector multiplication of a vector representing the similarity scores by a vector in the preference matrix corresponding to the user.

25. The system of claim 22, further comprising a step of:

means for providing the relevancy score to a delivery mechanism to deliver message information derived from the incoming message, the relevancy score, and the profile of the user to the user.

26. The system of claim 22, further comprising:

means for receiving user feedback from the user; and means for modifying the user's profile in the user profiles database based on the user feedback.

27. The system of claim 26, wherein the means for receiving user feedback comprises means for receiving an indication from the user that the user has expressed a positive preference for the message information.

28. The system of claim 26, wherein the means for receiving user feedback comprises means for receiving an indication from the user that the user has expressed a negative preference for the message information.

29. The system of claim 22, further comprising:

means for developing message information based on the incoming message, the relevancy score, and the profile of the user; and means for delivering the message information to the user.

30. The system of claim 29, wherein the user profiles database includes a relevancy threshold for the user, and wherein the means for developing message information comprises means for comparing the relevancy score to the relevancy threshold, and wherein the means for delivering the message information comprises means for delivering the message information to the user only if the relevancy score satisfies the relevancy threshold.

31. The system of claim 29, wherein the user profiles database includes a maximum number users to whom the message information is to be delivered, and wherein the means for delivering the message information comprises means for delivering the message information to no greater than the maximum number of users.

32. The system of claim 29, wherein the means for delivering the message information comprises means for sending the message information to the user as an electronic mail message.

33. The system of claim 29, wherein the means for delivering the message information comprises means for updating a message display using the message information.

34. A computer-readable medium encoded with a program for execution on a host computer in a computer system including the host computer, the program, when executed on the host computer performs a method for evaluating the relevancy of an incoming message to a user of a system having a message feature database including a plurality of records, each record descriptive of the features of a message and having a user profiles database including a profile of the user, including information descriptive of the user's preferences for the features of the messages, the method comprising steps of:

(A) generating a plurality of similarity scores, each similarity score indicating the similarity of the incoming message to the features of a respective one of the messages, including generating each similarity score by comparing the incoming message to the features of the respective one of the messages; and (B) generating a relevancy score for the user indicating a relevancy of the incoming message to the user based on the plurality of the similarity scores and the profile of the user, including comparing the user profile to the plurality of similarity scores to generate the relevancy score.

35. The computer-readable medium of claim 34, wherein the step (A) comprises steps of:

querying the message feature database using the incoming message to develop search results; and generating the relevancy score based on the search results.

36. The computer-readable medium of claim 34, wherein the user profiles includes a preference matrix indicating preferences of a plurality of users, including the user, for the features, and wherein the step (B) comprises steps of:

generating the relevancy score by performing vector multiplication of a vector representing the similarity scores by a vector in the preference matrix corresponding to the user.

37. The computer-readable medium of claim 34, wherein the method further comprises a step of:

(C) providing the relevancy score to a delivery mechanism to deliver message information derived from the incoming message, the relevancy score, and the profile of the user to the user.

38. The computer-readable medium of claim 34, wherein the method further comprises steps of:

(C) receiving user feedback from the user; and (D) modifying the user's profile in the user profiles database based on the user feedback.

39. The computer-readable medium of claim 38, wherein the step (C) comprises a step of receiving an indication from the user that the user has expressed a positive preference for the message information.

40. The computer-readable medium of claim 38, wherein the step (C) comprises a step of receiving an indication from the user that the user has expressed a negative preference for the message information.

41. The computer-readable medium of claim 34, wherein the method further comprises steps of:

(C) developing message information based on the incoming message, the relevancy score, and the profile of the user; and (D) delivering the message information to the user.

42. The computer-readable medium of claim 41, wherein the user profiles database includes a relevancy threshold for the user, and wherein the step (C) comprises steps of:

(C)(1) comparing the relevancy score to the relevancy threshold; and wherein the step (D) comprises a step of:

(D)(1) delivering the message information to the user only if the relevancy score satisfies the relevancy threshold.

43. The computer-readable medium of claim 41, wherein the user profiles database includes a maximum number of users to whom the message information is to be delivered, and wherein the step (D) comprises a step of:

(D)(1) delivering the message information to no greater than the maximum number of users.

44. The computer-readable medium of claim 41, wherein the step (D) comprises a step of sending the message information to the user as an electronic mail message.

45. The computer-readable medium of claim 41, wherein the step (D) comprises a step of updating a message display using the message information.

\* \* \* \* \*